United States Patent [19]

Peck et al.

[11] Patent Number: 4,521,371
[45] Date of Patent: Jun. 4, 1985

[54] VESSEL LIQUID LEVEL INDICATION

[75] Inventors: Daniel A. Peck, South Windsor; Vincent M. Callaghan, West Granby, both of Conn.

[73] Assignee: Combustion Engineering, Inc., Windsor, Conn.

[21] Appl. No.: 331,419

[22] Filed: Dec. 16, 1981

[51] Int. Cl.³ .............................................. G21C 17/00
[52] U.S. Cl. ................................... 376/245; 376/258; 177/211
[58] Field of Search .................. 376/245, 258; 73/296, 73/862.04, 862.54; 177/211, 246

[56] References Cited

U.S. PATENT DOCUMENTS

| | | | |
|---|---|---|---|
| 2,380,249 | 7/1945 | Kuehni | 73/296 |
| 2,932,501 | 4/1960 | Hicks | 73/862.04 |
| 3,082,621 | 3/1963 | Soderholm | 73/296 |
| 3,559,059 | 1/1971 | Martin et al. | 177/211 |
| 4,004,647 | 1/1977 | Forst et al. | 73/862.54 |
| 4,044,920 | 8/1977 | Swartzendruber | 73/862.65 |
| 4,094,369 | 6/1978 | Blanc et al. | 177/211 |
| 4,135,392 | 1/1979 | Young | 177/211 |
| 4,212,360 | 6/1980 | Chesher | 177/211 |
| 4,275,447 | 6/1981 | Ruiz | 376/258 |
| 4,302,288 | 11/1981 | Youngborg | 376/258 |
| 4,304,636 | 12/1981 | Tanner | 376/258 |

Primary Examiner—Sal Cangialosi
Attorney, Agent, or Firm—L. James Ristas

[57] ABSTRACT

Means and method are disclosed for determining the fluid content within a large pressure vessel (12), without penetrating the vessel. Strain gauges (60) are located at the weight-bearing support structures (24) of the vessel, whereby calibrated differences in the weight of the empty vessel and the vessel as measured during operation gives a direct indication of fluid content. Preferably, the strain gauges (60) are associated with strain amplification elements (80) or shims, which are interposed between mating surfaces of the vessel support (24) and its base (44). The stress amplification element (80) has a smaller area of contact with the support member (24) than with the base (44), providing an effective higher coefficient of elasticity than that of the support member. In one embodiment, the strain gauge (60) is connected to a bolt (64) which tightly secures the vessel support (24) to its base (44).

15 Claims, 10 Drawing Figures

VESSEL LIQUID LEVEL INDICATION

BACKGROUND OF THE INVENTION

This invention relates to nuclear steam generating equipment, and particularly to fluid measurements in the various components thereof.

During normal steady state operation of steam generating systems having several heat exchange, fluid storage, heat generating and pressurizer components, important properties such as the mass of the fluid in the system, its state, and the distribution thereof, are usually uniquely determinable through direct measurement of liquid level, fluid flow rate, and a calculation of heat and mass balance. However, in nuclear power steam supply systems (NSSS), and especially in the pressurized water type having primary and secondary fluid loops, the continuous determination of the distribution and state of the fluid within the system during transient conditions is much more difficult. Under accident conditions, such as those encountered at the Three Mile Island nuclear plant in March, 1979, conventional instrumentation may be inadequate for providing continuous, useable data that can quickly characterize the fluid condition in the system so that corrective measures can be confidently implemented.

Such fluid characterization is essential with respect to the nuclear reactor vessel, which contains thousands of uraninum-bearing fuel rods. Even after the nuclear chain reaction is terminated by scramming the reactor at the onset of an accident, residual heat continues to be generated and must be removed from the fuel rods or rod melting may occur. If insufficient fluid is available in the vessel to absorb and transport the heat, the melting rods will release their highly radioactive content to the fluid and contaminate the reactor building. Accordingly, the paramount purpose of safety systems in nuclear reactor installations is the maintenance of core cooling capability by assuring that the liquid level therein is sufficient to at least cover the fuel.

Suitable liquid level indicators for nuclear reactor vessels are not readily available, as conventional devices cannot easily and reliably be adapted for the hostile and turbulent conditions which may occur in the vessel during a nuclear accident.

SUMMARY OF THE INVENTION

The present invention provides novel means and method for determining the fluid content within a large pressure vessel, without the need to penetrate the vessel. This is achieved by locating strain gauges at the weight-bearing support structures for the vessel, whereby the differences in weight of the empty vessel and the vessel as measured gives a direct indication of fluid content. Preferably, the strain gauges are associated with strain amplification shims which are typically interposed between mating surfaces of the vessel supports and its base. The shim typically is made of a higher strength material than the vessel and support so that the vessel load can be accommodated over a smaller surface area. The stress on the smaller surface area of the shim produces a larger strain which can more easily be detected and interpolated by the strain gauge instrumentation.

In a system such as an NSSS, many components are structurally, as well as fluidically, interactive. The invention also contemplates coordinating strain gauge signals from several components in a way that removes the effects of pressure and thermal transients manifested at the vessel supports, which are not due to the weight of the liquid in the vessel. This is done by properly calibrating the system during initial startup of the power plant. Strain gauge data are taken on support members for the reactor, steam generator, pressurizer, and reactor coolant pump, for the test conditions of:

a. no liquid in the reactor coolant system,
b. the reactor coolant system filled at room temperature,
c. the reactor coolant system filled at hot conditions, and
d. the reactor coolant system filled at hot conditions with the pressurizer drained.

During each of these four conditions, the fluid level and temperature of the secondary portion of the plant are preferably changed to obtain data parametric in secondary conditions. Proportionality constants can thus be obtained for the four major primary components and a simple program can be provided to receive the strain gauge measurements and according to the weighting factors, provide a readout of integrated fluid content as well as fluid content in each component.

The output from the programmed circuit can be displayed to the operator as a time history of the fluid level both for the reactor coolant system and for individual components. Preferably, a base line is displayed corresponding to the calibration measurements made during initial startup of the plant. The recent time dependent signal is overlayed on the base signal such that the operator can quickly perceive a deviation from the base signal as well as the recent time dependent rate of change of signal, whereby corrective action can be more confidently taken.

Thus, the present invention provides indication of fluid level content for individual vessels and for the reactor coolant system, as well as providing convenient, time dependent data for assisting the operator monitor transients and take necessary corrective action.

BRIEF DESCRIPTION OF THE DRAWINGS

The preferred embodiment of the invention will be fully described in the remaining portion of the specification and the accompanying drawings in which.

DESCRIPTION OF THE PREFERRED EMBODIMENT

Figure 1:
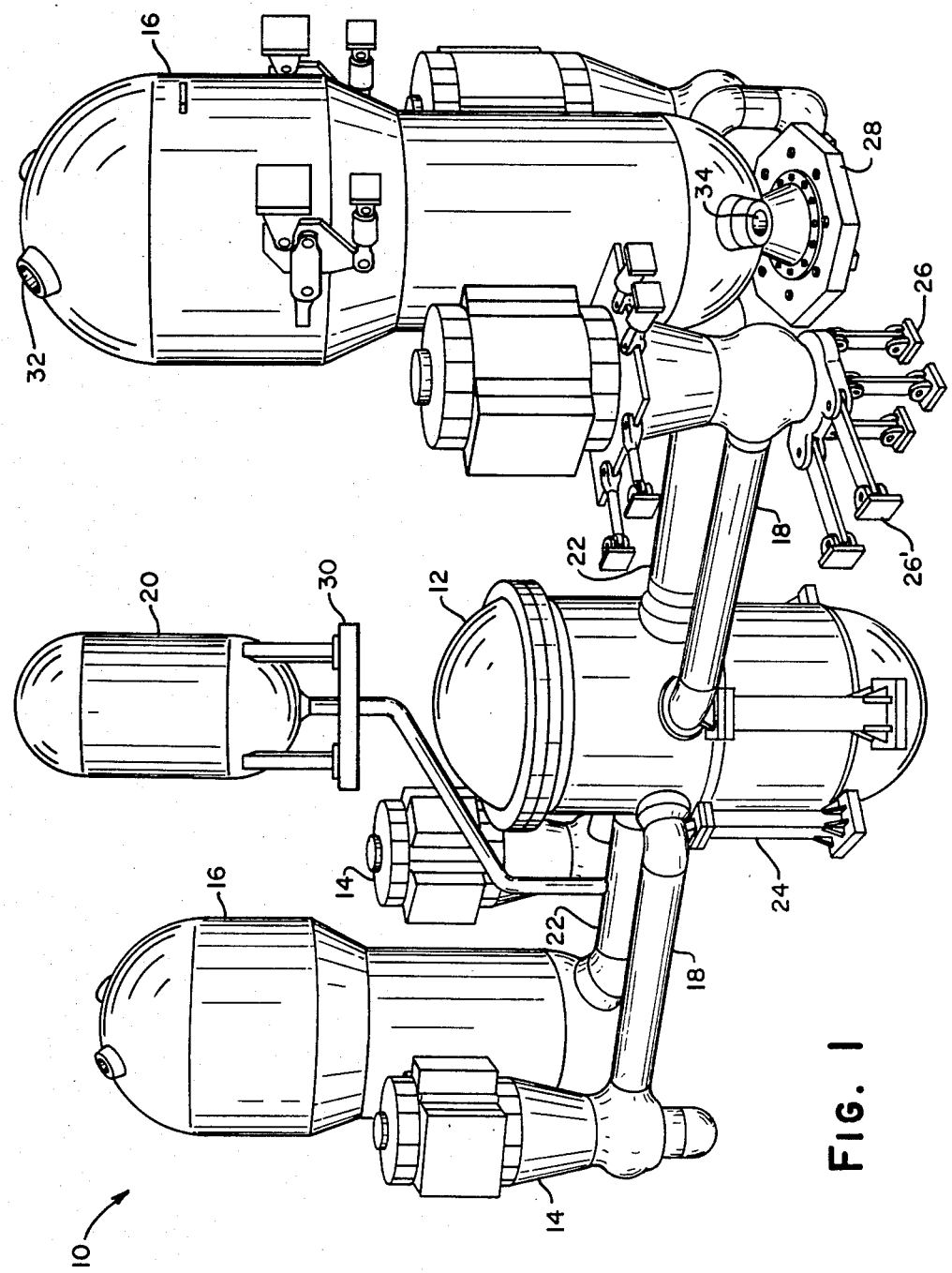
FIG. 1 is a schematic of a typical nuclear steam supply system, showing typical support members for the large system components.

FIG. 1 schematically shows the major components in a pressurized water reactor nuclear steam supply system 10, including a reactor vessel 12, primary coolant pumps 14, steam generators 16, and pressurizer 20. The reactor inlet, or cold leg 18 and the reactor outlet or hot legs 22, provide convenient structure by which the reactor vessel 12 is suspended on vessel support members 24. The primary coolant pumps 14 are typically supported vertically and horizontally by pump support struts 26, 26' respectively. The steam generator 16 is also supported by a support skirt 28, and the pressurizer is supported on stand 30.

The NSSS shown in FIG. 1 is fairly typical in that the various components are at different elevations, and in particular, the water levels therein during a severe accident may be at different levels or elevations. Under normal conditions, the total mass of water within the primary system is substantially constant, with the secondary side of the steam generator 16 receiving feedwater flow through nozzle 34 and discharging steam through nozzle 32.

As will be further described hereinbelow, the invention provides strain gauge sensors at the load bearing supports for the reactor vessel 12, and preferably the reactor coolant pumps 14, steam generators 16, and pressurizer 20.

Figure 2:
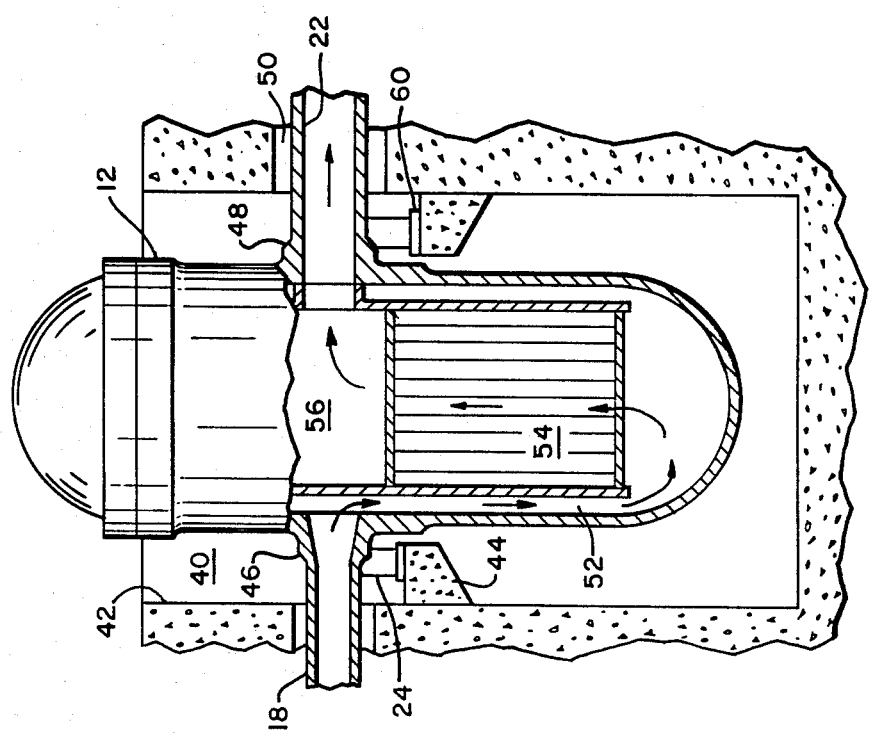
FIG. 2 is a schematic vertical section of a typical nuclear reactor vessel, showing the fluid flow path therethrough and the vessel supports at the pipe nozzles.

FIG. 2 shows in schematic detail the reactor vessel and the coolant flow paths therein. Typically, the vessel 12 is suspended within the vessel cavity 40 defined by the biological shield wall 42. The vessel support ledges 44 provide a base on which the vessel support members 24 extend upward to support the vessel from the inlet and outlet nozzles 46, 48. The inlet and outlet pipes 18 and 22 pass through conduits 50 in the biological shield 42 and, therefore, do not bear the weight of the vessel 12.

As the reactor coolant enters the vessel through nozzle 46, it flows in the downcomer region 52, turns upwardly and flows through the reactor core 54 where the coolant removes the heat produced by the fissions in the fuel assemblies. The temperature of the coolant before it enters the core 54 is about 560 F. and the temperature at the plenum 56 above the core is about 620 F. The heated water flows from the plenum 56 through the outlet nozzle 48 and through the pipe 22 to the steam generator 16 (see FIG. 1). It is of paramount importance to keep the reactor core 54 immersed in liquid coolant at all times, even when the reactor is shut down and not producing fission power. Even when the reactor is shut down, the radioactivity of the material in the core 54 generates residual heat, which can be several percent of the full power heat generation rate.

Referring now to FIGS. 1 and 2, the pressurizer 20 normally has a steam volume above a water volume and means (not shown) for increasing or decreasing the pressure therein such that the pressure of the entire NSSS primary loop is maintained at approximately 2250 psi. This pressure is sufficient to maintain the primary coolant water in the liquid state throughout the system. In the event coolant voids should form in the primary loop, they would usually accumulate in the pressurizer 20. A variety of hypothetical postulated accidents or malfunctions could occur with the result that unwanted steam could form in the primary loop. Since the reactor vessel 12 and, particularly the core 54, is at the lowest elevation of the various NSSS components, the reactor core should be the last place where voids would accumulate. As the experiences at the Three Mile Island accident have shown, however, the behavior of the water level in the vessel 12 is not necessarily uniquely predictable or measureable. It is not impossible, for example, that during an accident a steam bubble could form within the vessel above the core 54, be trapped therein, and prevent water from flowing through the core. Steam trapped anywhere in the system, between water at higher and lower elevations, could mislead conventional level gauges into indicating erroneous water content. Recognizing the importance of reliable water level indications, the nuclear regulatory authorities have recently required nuclear installations to be outfitted with instruments for indicating directly or indirectly the coolability of the reactor core 54.

According to the present invention, means for producing an electrical signal proportional to the changes in strain, such as strain gauges 60, are located in the load bearing or fastening portions of the support members 24. The strain gauges are calibrated during the initial startup of the plant so that the output signals thereof are correlated with liquid content of the vessel.

Figure 3:
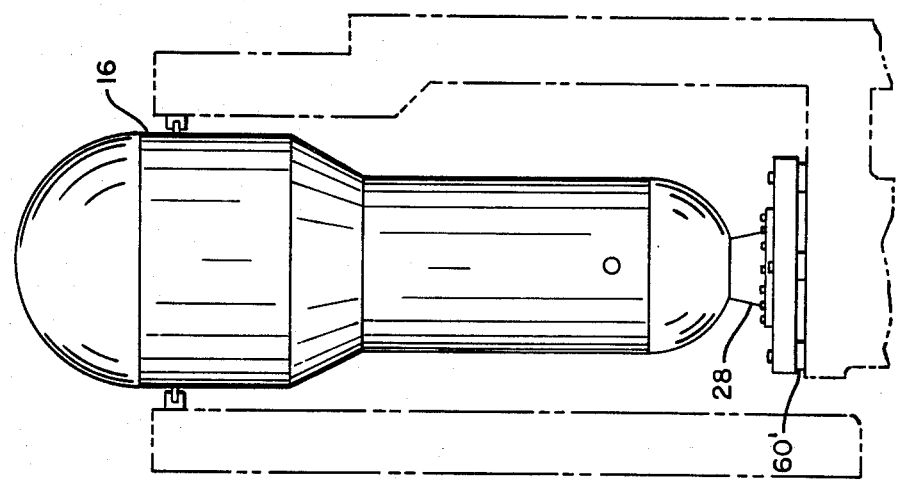
FIG. 3 is a schematic elevation view of a steam generator and the support structure therefor.

FIG. 3 shows in greater detail the support skirt 28 for the steam generator 16 and indicates the location of the strain gauge 60'.

Figure 4:
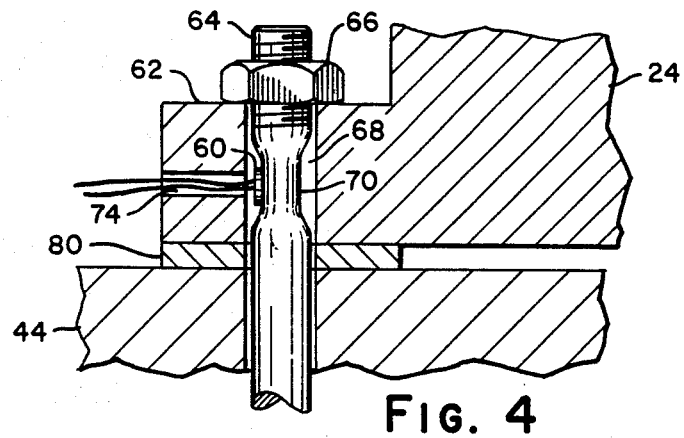
FIG. 4 is a partially sectioned schematic view of a reactor vessel support member, with the strain gauge and stress amplification element illustrated.

FIG. 4 shows in detail the location of the strain gauge 60 with respect to the load bearing support member 24 shown in FIG. 2. The member 24 typically has a flanged portion 62 having openings 68 through which a bolt 64 passes to engage the support ledge or base 44. The bolt is secured by a nut 66 and serves as an elastically deformable connector. According to the invention, the bolt 64 has a neck portion 70 on which is secured the strain gauge 60. The flange 62 has a channel 74 through which the lead wires 72 may connect to the strain gauge. The strain gauge 60 detects the amount of elongation of the neck portion 70 of the bolt 64, which depends on the load bearing vertically downward on the support member 24 and flange 62. When the nut 66 is initially tightened against the flange 62, the neck 70 is initially elongated and reaches an equilibrium strain. As the load on the support member 24 changes, the "tightness" between the nut 66 and the flange 62 changes, with a corresponding change in the stress and strain on the neck portion 70 of the bolt 64. Thus, as the vessel weight increases and the flange 62 is compressed, the stress on the bolt 64 decreases.

Although the stress and strain relationship is nearly proportional, and detectable by special purpose, commercially available strain gauges, the resolution may be enhanced considerably allowing the use of readily available, environmentally qualified strain gauges, by providing a stress amplification element 80 between the flange 62 (or the entire bottom) of the support member 24 and the support ledge or base 44. In a manner to be described herein below in connection with FIGS. 6 and 7, the strain amplification element 80 produces a greater strain for the same amount of stress on the bolt 64 and the range of signal obtained from the strain gauge 60 is, therefore, increased.

Figure 5:
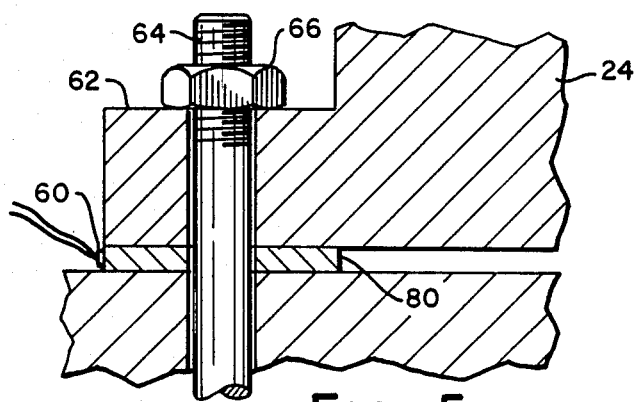
FIG. 5 shows an alternative embodiment of the invention as illustrated in FIG. 4 with the strain gauge located on the amplification element.

FIG. 5 shows an alternative embodiment wherein the strain gauge 60 is placed on the outer lateral surface of the stress amplification element. This eliminates the need for the necked portion 70 on the bolt and the channel 72 in the flange 62.

The strain amplification elements 80 operate as follows. The support structures for the various reactor coolant system components transmit loads through large areas, such as the flange 62 shown in FIG. 4, made of normal strength steel, such as SA508-CL2. The resulting strain is kept low. By inserting the strain amplification element as a shim of high strength steel with reduced load transmission area in series with the normal component supports, it is possible to amplify the strain experienced during changes in the liquid inventory of the component. This in effect provides a higher coefficient of elasticity. The high strength steel strain amplification element 80 remains elastic over its range of use and does not impact on the performance of the remainder of the support system. The effect of the amplification element on deformation of the supports is minimal since the element thickness at the point where the strain is to be measured, need be no thicker than the strain gauge width. By designing the geometry of the amplification element carefully. It is possible to produce a region of very high strain measurement sensitivity to the range of weight change associated with the change in liquid level of each component.

Figure 6:
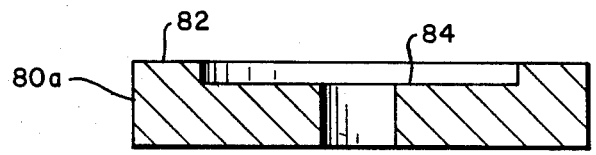
FIG. 6 is a detailed schematic of one type of stress amplification element suitable for use in the present invention.

FIG. 6 shows one type of strain amplification element 80a suitable for use in the arrangement shown in FIGS. 4 and 5. The element is generally annular and is shown in section where the outer portions 82 of the element are thicker than the recessed inner portions 84. The outer portion 82 is raised to provide a limited load bearing area during normal operation. The small area relative to the main body 84 of the element and the base of the flange and support member 24 (as shown in FIG. 4) significantly increases the stresses on a relatively limited area and, therefore, produces significantly greater strain than would be available without the amplification. Thus, the strain gauge 60 detects a substantial strain and provides an output signal that may be calibrated over a useful discrimination interval. The main portion 84 of the element provides additional area in the event a severe loading strains the raised portion beyond the normal operating range, such as might occur during an earthquake.

Figure 7:
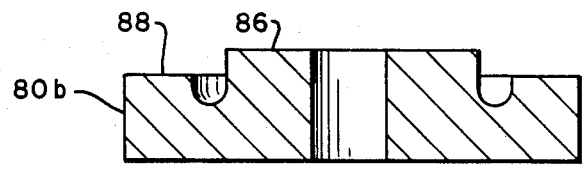
FIG. 7 is a detailed schematic of an alternative stress amplification element suitable for use in the present invention.

FIG. 7 shows an alternative embodiment of the strain amplification element 80b wherein the raised portion 86 is in the inner portion and the outer annulus 88 is recessed to provide the additional area for handling excessive loads.

Typical strain gauges for use with the present invention are approximately one inch square and, accordingly, the thickness of the raised or projecting portion 82,86 of the strained amplification element 80a,80b need be only slightly larger than one inch. Bonded wire resistence strain gauges (SR-4 gauges) as well as foil and printed gauges are usable. The gauges may be bonded to the amplification element by agents such as bakelite which can withstand the temperatures (several hundred degrees F.) which may be experienced during the conditions of interest.

The foregoing description related to the invention as used for determining the weight and, therefore, the mass of liquid that is present in the reactor vessel 12 or steam generator 16. Although the use of the present invention on only a single component such as reactor vessel 12, provides sufficient indication of coolant mass in the vessel to provide a meaningful measure of core coolant, an integrated use of such detectors on the pressurizer supports 30, steam generator supports 28, and the reactor coolant pump struts 26 provides significantly more information to the operator regarding the time dependent behavior of the water content in the individual components and the interactions between the various components.

Figure 8:
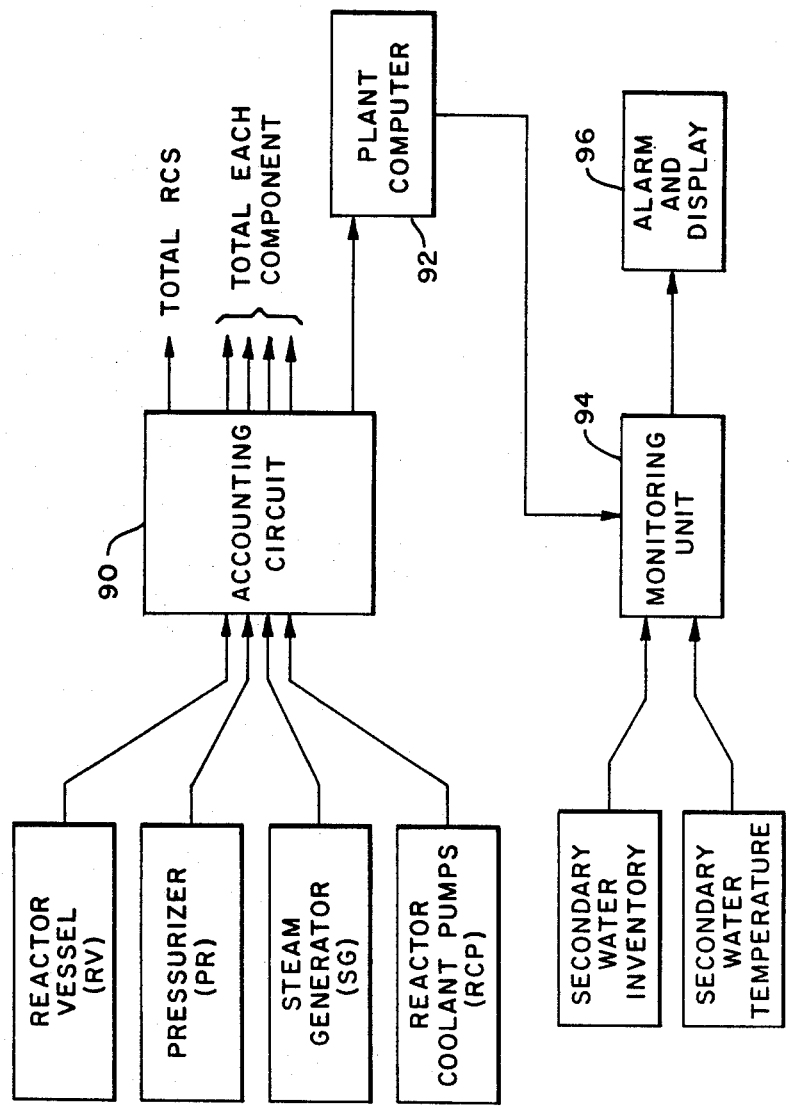
FIG. 8 is a flow diagram summarizing a typical information handling scheme in accordance with the present invention.

Referring to FIG. 8, a schematic logic diagram shows the strain gauge output signals from the reactor vessel, pressurizer, steam generator, and reactor coolant pump supports 24,30,28,26 all feeding into an accounting circuit 90 which contains therein proportionality constants to be applied to each of the input signals. The proportionality constants are determined during initial calibration (to be described below), and are generally proportional to the normal liquid content in each of the components. Thus, the reactor vessel contributes more than the pressurizer, which, in turn, contributes more than the steam generator and reactor coolant pumps. The output from the accounting circuit 90 preferably includes an integrated readout which indicates the total mass of water in the reactor coolant system, and individual readings on the components. Also, the output may be sent to a plant computer 92 for the recording of the time history of the relevant output signals. A monitoring unit 94 receives the time histories of the water content of the primary system components and also receives information from the secondary system, particularly secondary system water inventory and temperature. The monitoring unit continually calculates alarm set points and may also provide output to CRT displays 96 where the relevant information may be used by the operator.

Figure 9A:
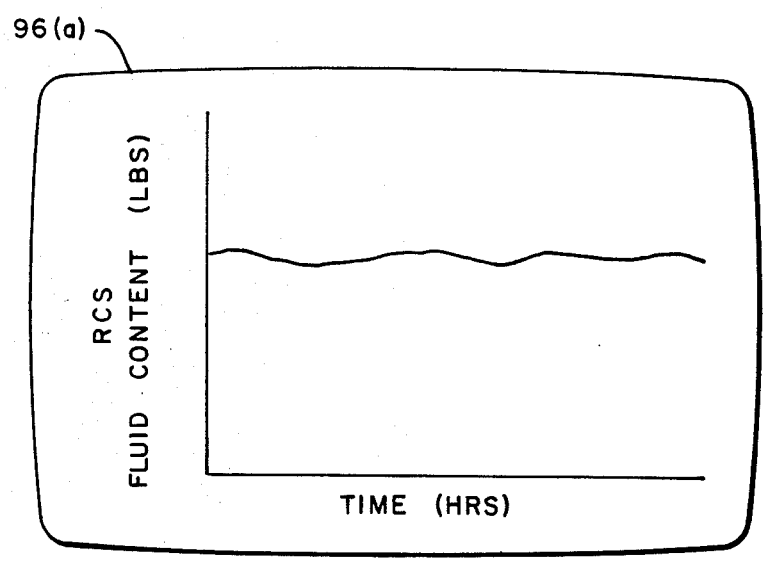
FIGS. 9a and 9b illustrate schematically the output signals according to the preferred embodiment of the invention which permits online, continuous monitoring of the fluid conditions in the NSSS.
Figure 9B:
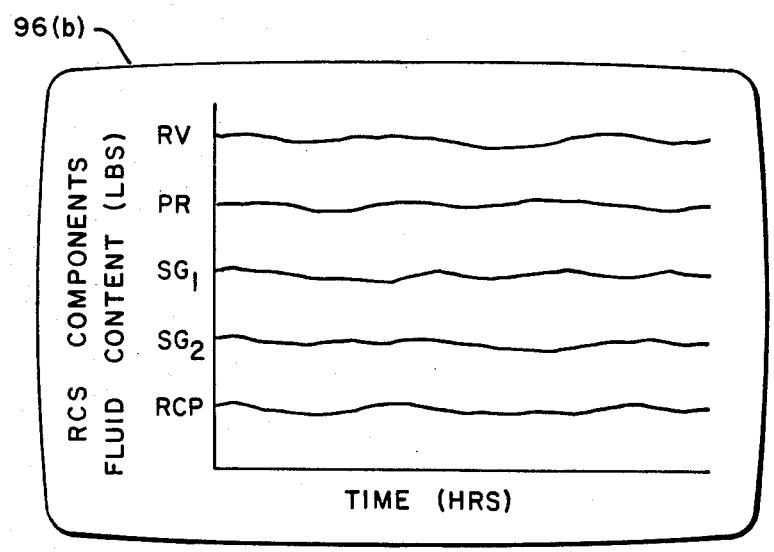

FIGS. 9a, and 9b illustrate typical CRT displays. FIG. 9(a) shows a time display 96a of pounds of fluid in the reactor coolant system over a relevant time period, such as 24 hours. FIG. 9(b) displays 96b the pounds of fluid in the individual primary components over the same time period. As a further refinement of the displays, a base line value can be displayed for each of the outputs, corresponding to the calibrated condition, thereby giving an absolute difference between the recent values and the base values.

The method of the present invention includes attaching the strain gauges to the component support members, calibrating the gauges during plant start up, the monitoring the components during plant operation to provide output signals indicative of the total fluid content of the reactor coolant system and the fluid content of at least the reactor vessel.

Referring again to FIGS. 1,2,5, and 8, the first step of the method is to attach strain gauges 60 to the vertical support members 24,28,26, and 30, of the major nuclear steam supply reactor coolant system components, namely the reactor vessel, the steam generators, pumps, and pressurizer. Preferably, the above described strain amplification element 80 is inserted between each support member and its respective base such that the strain gauge can be attached in a location of amplified strain to enhance the output signal quality and accuracy. The signals from the various strain gauges are then received at a central processing location where, in a modern power plant, a dedicated computer or other conventional data processing equipment would calulate the net fluid content of each component and preferably provide a output signal indicative of the total fluid content of the reactor coolant system and in particular the content of the reactor vessel.

Proper calibration of the gauges is performed during start up testing of the plant by recording the output signals indicative of support member strain measured at a variety of plant conditions including:

1. no water in the reactor coolant system,
2. the reactor system filled with water at ambient temperature
3. the reactor coolant system filled with water at hot operating temperatures
4. the reactor coolant system filled at hot operating conditions with the pressurizer drained.
5. modulation of secondary inventory (which remains measurable using conventional instrumentation during normal and accident conditions).

Particularly when implemented in a pressurized water nuclear steam supply system, these measurements should preferably be taken parametric in secondary system operating conditions of temperature and pressure.

The next step is determining the appropriate proportionality constants for the strain gauge output from each of the components such that the sum of the products of the proportionality components and the change in the respective strain gauge outputs is substantially equal to the change in reactor coolant system fluid content during calibration. The several calibration measurements enable the proportionality constants to be temperature dependent.

Finally, the plant is started up and the monitoring performed such that the operator may receive on line information of the type previously described and illustrated in FIGS. 8 and 9.

What is claimed is:

1. In a nuclear steam supply reactor coolant system having a plurality of fluidly connected components including a nuclear reactor vessel, a steam generator, pump means, and pressurizer, each resting on at least one vertical support member which in turn is connected to a respective base, a method of determining the fluid content in the reactor vessel comprising:

attaching a strain gauge to a vertical support member of each of said components whereby a change in the strain on each support member due to vertical stress is sensed by each gauge;
receiving the output signals of the strain gauges at a central processing location;
calibrating the gauges during the start up testing of the reactor coolant system by recording the output signals indicative of support member strain measured at a variety of plant conditions including,
a. no water in the reactor coolant system,
b. the reactor coolant system filled with water at ambient temperature,
c. the reactor coolant system filled with water at hot operating conditions, and
d. the reactor coolant system filled with water at hot operating conditions with the pressurizer drained;
determining a proportionality constant for the strain gauge output from each component such that the sum of the products of the proportionality constants and the change in respective strain gauge outputs is substantially equal to the change in reactor coolant system fluid content during calibration;
after completing the start up testing, monitoring the strain gauge signals at the central processing location and generating display signals indicative of the total fluid content of the reactor coolant system and the fluid content of at least the reactor vessel component.

2. The method according to claim 1, wherein the step of attaching strain gauges to the vertical support members includes inserting a strain amplification element between each support member and its respective base and attaching the strain gauge in a location of amplified strain.

3. An arrangement for determining the fluid content of a vessel, comprising:

a vertically extending metal support member for carrying the weight of the vessel and its contents;
a base to which the support member is secured;
an elastic connector maintained in tension between the support member and the base for securing the support member and base tightly together;
a strain amplification element disposed between the support member and the base, having a higher coefficient of elasticity than that of the support member;
means for producing an electrical signal proportional to the strain of the connector due to a change in the weight of the vessel and its contents.

4. The arrangement of claim 3 wherein the means for producing an electrical signal includes a strain gauge.

5. The arrangement of claim 4 wherein the strain amplification element is a metal shim having a smaller area of contact with the support member than with the base.

6. The arrangement of claim 5 wherein the strain gauge is located on the outer lateral surface of the strain amplification element.

7. The arrangement of claim 6 wherein the strain amplification element is generally annular, having an outer portion that is thicker than a recessed inner portion.

8. The arrangement of claim 6 wherein the strain amplification element is generally annular, having a thicker inner portion and a recessed outer portion.

9. The arrangement of claim 5 wherein the support member has a flanged portion through which the connector penetrates the base, and wherein the strain amplification element is located beneath the flange.

10. The arrangement of claim 3 wherein the connector is a threaded bolt.

11. The arrangement of claim 10 wherein the bolt has a narrowed neck portion and the strain gauge is located on said neck portion.

12. The arrangement of claim 3 wherein the vessel is a nuclear reactor, the support member has a flanged lower portion, and wherein the connector is a bolt passing through said flange and penetrating said base.

13. The arrangement of claim 12 wherein said strain amplification element is disposed between the flange and the base.

14. The arrangement of claim 13 wherein the means for producing an electrical signal proportional to the strain of the connector is a strain gauge affixed to the connector.

15. The arrangement of claim 13 wherein the means for producing an electrical signal proportional to the strain of the connector includes a strain gauge affixed to the strain amplication element.

* * * * *